(12) United States Patent
Tomizawa

(10) Patent No.: US 7,953,159 B2
(45) Date of Patent: May 31, 2011

(54) RECEIVING APPARATUS AND RECEIVING METHOD

(75) Inventor: Kenji Tomizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1257 days.

(21) Appl. No.: 11/476,025

(22) Filed: Jun. 28, 2006

(65) Prior Publication Data

US 2007/0032978 A1 Feb. 8, 2007

(30) Foreign Application Priority Data

Jun. 29, 2005 (JP) ................................ 2005-190312

(51) Int. Cl.
*H04N 7/18* (2006.01)
(52) U.S. Cl. ............................... 375/240.26; 375/240.25
(58) Field of Classification Search . 375/240.01–240.29
See application file for complete search history.

(56) References Cited

U.S. PATENT DOCUMENTS

| | | | |
|---|---|---|---|
| 6,091,772 A | 7/2000 | Anderson et al. | |
| 7,495,707 B2 * | 2/2009 | Kondo et al. | 348/555 |
| 2005/0265337 A1 | 12/2005 | Tomizawa | |

FOREIGN PATENT DOCUMENTS

| | | |
|---|---|---|
| CN | 1182328 A | 5/1998 |
| CN | 1578451 A | 2/2005 |
| JP | 10-304325 | 11/1998 |
| JP | 2000-22747 | 1/2000 |
| JP | 2003-51801 | 2/2003 |
| JP | 2004-140520 | 5/2004 |
| JP | 2005-26955 | 1/2005 |
| JP | 2005-45775 | 2/2005 |
| JP | 2005-333474 | 12/2005 |
| JP | 2006-20310 | 1/2006 |

OTHER PUBLICATIONS

Office Action issued Jan. 11, 2011, in Japan Patent Application No. 2005-190312 (with English-language Translation).

* cited by examiner

*Primary Examiner* — Andy S Rao
(74) *Attorney, Agent, or Firm* — Oblon, Spivak, McClelland, Maier & Neustadt, L.L.P.

(57) ABSTRACT

There is provided a receiving apparatus configured to extract particular information from multiple pieces of information included in a received signal, the receiving apparatus including: an extraction condition storage circuit 21 configured to store a first extraction condition for detecting a particular data pattern which identifies the particular information and a second extraction condition for supplementing the first extraction condition; a grouping circuit 22 configured to divide and collect the first extraction condition based on the second extraction condition to output multiple group extraction conditions; and determination circuit 23 configured to determine whether or not the data patterns of the multiple pieces of information satisfy the multiple group extraction conditions.

12 Claims, 13 Drawing Sheets

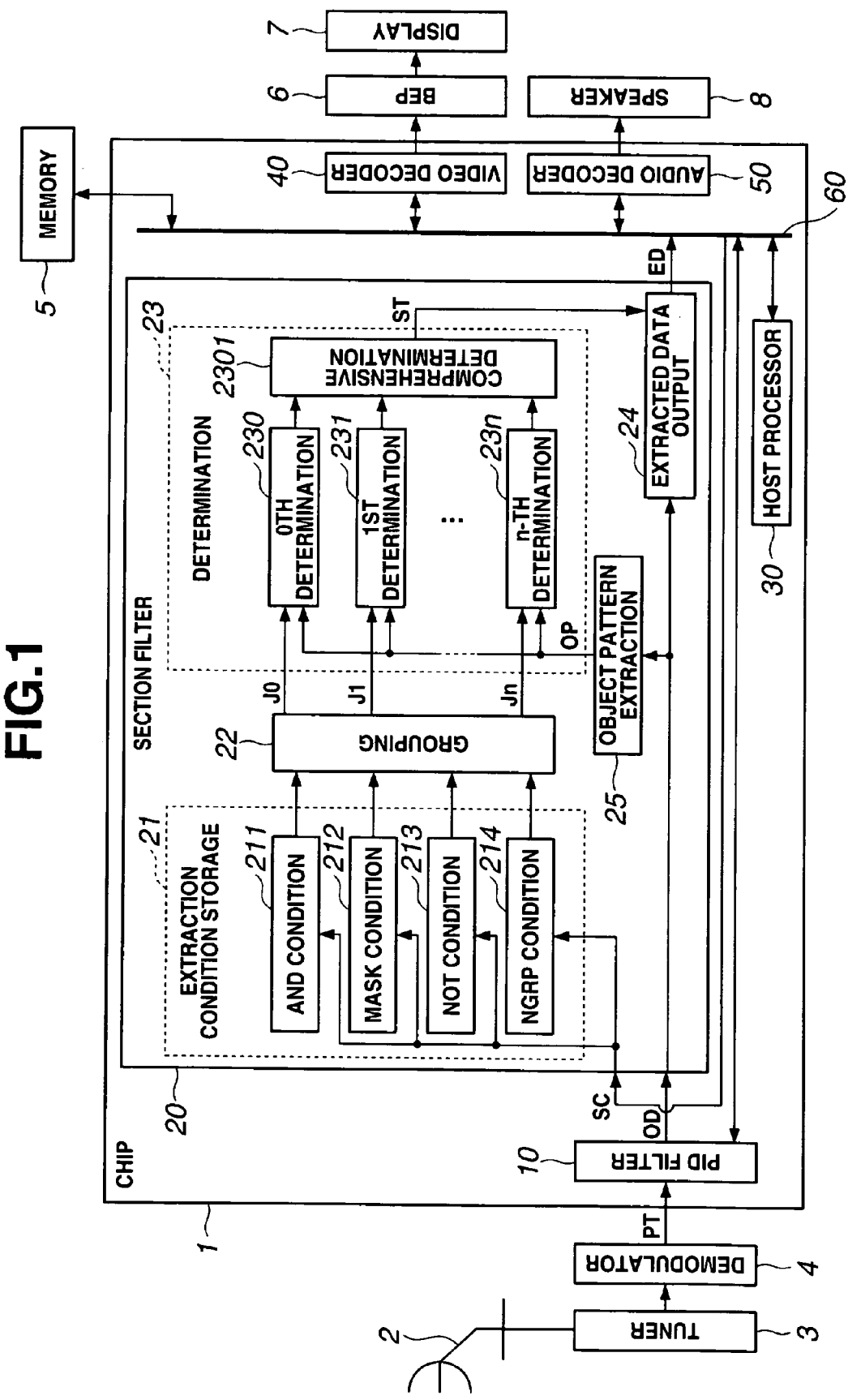

| OBJECT PATTERN | b0 | b1 | b2 | b3 |
|---|---|---|---|---|
| AND CONDITION | 1 | 1 | 0 | 0 |
| MASK CONDITION | 0 | 1 | 0 | 0 |
| NOT CONDITION | 0 | 1 | 1 | 0 |
| EXTRACTED PATTERN | 1 | 1 | 1 | 0 |
| | 1 | 0 | 1 | 0 |

FIG.3

| | | | | |
|---|---|---|---|---|
| OBJECT PATTERN | 1 | 1 | 1 | 0 |
| | 1 | 0 | 1 | 0 |
| AND CONDITION | 1 | 1 | 0 | 0 |
| MASK CONDITION | 0 | 0 | 1 | 0 |
| NOT CONDITION | 0 | 1 | 1 | 0 |
| EXTRACTED PATTERN | 1 | 0 | 1 | 0 |

FIG.4

| OBJECT PATTERN | b0 | b1 | b2 | b3 |
|---|---|---|---|---|
| AND CONDITION | 1 | 1 | 0 | 0 |
| MASK CONDITION | 0 | 0 | 1 | 0 |
| NOT CONDITION | 0 | 1 | 0 | 0 |
| EXTRACTED PATTERN | 1 | 0 | 0 | 0 |
| | 1 | 0 | 1 | 0 |

FIG.5

| OBJECT PATTERN | b0 | b1 | b2 | b3 |
|---|---|---|---|---|
| AND CONDITION | 1 | 1 | 0 | 0 |
| MASK CONDITION | 0 | 1 | 0 | 0 |
| NOT CONDITION | 0 | 0 | 1 | 0 |
| EXTRACTED PATTERN | 1 | 1 | 1 | 0 |
| | 1 | 0 | 1 | 0 |

FIG.7

| | | | | | |
|---|---|---|---|---|---|
| 0TH GROUP EXTRACTION CONDITION J0 | AND CONDITION | 1 | 1 | 0 | 0 |
| | MASK CONDITION | 0 | 0 | 1 | 1 |
| | NOT CONDITION | 0 | 1 | 0 | 0 |
| 1ST GROUP EXTRACTION CONDITION J1 | AND CONDITION | 0 | 0 | 0 | 0 |
| | MASK CONDITION | 1 | 1 | 0 | 0 |
| | NOT CONDITION | 0 | 0 | 1 | 0 |

FIG.9

| | | | | | |
|---|---|---|---|---|---|
| 0TH GROUP EXTRACTION CONDITION J0 | AND CONDITION | 1 | 1 | 0 | 0 |
| | MASK CONDITION | 0 | 0 | 0 | 0 |
| | NOT CONDITION | 0 | 1 | 1 | 0 |
| 1ST GROUP EXTRACTION CONDITION J1 | AND CONDITION | 0 | 0 | 0 | 0 |
| | MASK CONDITION | 1 | 1 | 1 | 1 |
| | NOT CONDITION | 0 | 0 | 0 | 0 |

FIG.10

| | | | | | | | | |
|---|---|---|---|---|---|---|---|---|
| OBJECT PATTERN | d0 | d1 | d2 | d3 | d4 | d5 | d6 | d7 |
| AND CONDITION | a0 | a1 | a2 | a3 | a4 | a5 | a6 | a7 |
| MASK CONDITION | m0 | m1 | m2 | m3 | m4 | m5 | m6 | m7 |
| NOT CONDITION | n0 | n1 | n2 | n3 | n4 | n5 | n6 | n7 |
| NGRP CONDITION | 0 | 0 | 1 | 0 | 1 | 2 | 2 | 3 |

| | | | | | | | | | |
|---|---|---|---|---|---|---|---|---|---|
| 0TH GROUP CONDITION | AND CONDITION | a0 | a1 | | a3 | | | | |
| | MASK CONDITION | m0 | m1 | | m3 | | | | |
| | NOT CONDITION | n0 | n1 | | n3 | | | | |
| 1ST GROUP CONDITION | AND CONDITION | | | a2 | | a4 | | | |
| | MASK CONDITION | | | m2 | | m4 | | | |
| | NOT CONDITION | | | n2 | | n4 | | | |
| 2ND GROUP CONDITION | AND CONDITION | | | | | | a5 | a6 | |
| | MASK CONDITION | | | | | | m5 | m6 | |
| | NOT CONDITION | | | | | | n5 | n6 | |
| 3RD GROUP CONDITION | AND CONDITION | | | | | | | | a7 |
| | MASK CONDITION | | | | | | | | m7 |
| | NOT CONDITION | | | | | | | | n7 |

FIG.11

| OBJECT PATTERN | d0 | d1 | d2 | d3 | d4 | d5 | d6 | d7 |
|---|---|---|---|---|---|---|---|---|
| AND CONDITION | a0 | a1 | a2 | a3 | a4 | a5 | a6 | a7 |
| MASK CONDITION | m0 | m1 | m2 | m3 | m4 | m5 | m6 | m7 |
| NOT CONDITION | n0 | n1 | n2 | n3 | n4 | n5 | n6 | n7 |
| NGRP CONDITION | 0 | 0 | 1 | 0 | 1 | 2 | 2 | 3 |

0TH GROUP EXTRACTION CONDITION J0:

| AND CONDITION | a0 | a1 | <0> | a3 | <0> | | | |
|---|---|---|---|---|---|---|---|---|
| MASK CONDITION | m0 | m1 | <1> | m3 | <1> | | | |
| NOT CONDITION | n0 | n1 | <0> | n3 | <0> | | | |

1ST GROUP EXTRACTION CONDITION J1:

| AND CONDITION | <0> | a2 | <0> | a4 | <0> | | | |
|---|---|---|---|---|---|---|---|---|
| MASK CONDITION | <1> | m2 | <1> | m4 | <1> | | | |
| NOT CONDITION | <0> | n2 | <0> | n4 | <0> | | | |

2ND GROUP EXTRACTION CONDITION J2:

| AND CONDITION | <0> | a5 | a6 | <0> |
|---|---|---|---|---|
| MASK CONDITION | <1> | m5 | m6 | <1> |
| NOT CONDITION | <0> | n5 | n6 | <0> |

3RD GROUP EXTRACTION CONDITION J3:

| AND CONDITION | <0> | a7 |
|---|---|---|
| MASK CONDITION | <1> | m7 |
| NOT CONDITION | <0> | n7 |

FIG.13

| | | | | | | | | |
|---|---|---|---|---|---|---|---|---|
| AND CONDITION | a0 | a1 | a2 | a3 | a4 | a5 | a6 | a7 |
| MASK CONDITION | m0 | m1 | m2 | m3 | m4 | m5 | m6 | m7 |
| NOT CONDITION | n0 | n1 | n2 | n3 | n4 | n5 | n6 | n7 |
| NGRP CONDITION | 0 | 0 | 1 | 0 | 1 | 2 | 2 | 3 |

0TH GROUP EXTRACTION CONDITION J0
- AND CONDITION: a0 a1 a3
- MASK CONDITION: m0 m1 m3
- NOT CONDITION: n0 n1 n3

1ST GROUP EXTRACTION CONDITION J1
- AND CONDITION: a2 a4
- MASK CONDITION: m2 m4
- NOT CONDITION: n2 n4

2ND GROUP EXTRACTION CONDITION J2
- AND CONDITION: a5 a6
- MASK CONDITION: m5 m6
- NOT CONDITION: n5 n6

3RD GROUP EXTRACTION CONDITION J3
- AND CONDITION: a7
- MASK CONDITION: m7
- NOT CONDITION: n7

RECEIVING APPARATUS AND RECEIVING METHOD

This application is based upon and claims the benefit of priority from the prior Japanese Patent Applications No. 2005-190312, filed in Japan on Jun. 29, 2005; the entire contents of which are incorporated herein by reference.

BACKGROUND OF THE INVENTION

1. Field of the Invention

The present invention relates to a signal receiving apparatus and a receiving method, and in particular to a television signal receiving apparatus which performs filtering of a received signal and a receiving method.

2. Description of Related Art

A fixed-length packet with 188 bytes is used for "Transport Stream (TS), a packet transmission format used in digital broadcasting and the like, and it makes it possible to periodically transmit information for enabling decoding even when receiving is started in the middle of a program, in addition to image information and audio information. Such information is referred to as "service information (SI)" or "program specific information (PSI)". It is assumed that SI in the description below includes PSI.

In a digital broadcasting system, it is identified by a receiving side (a decoding side) what kind of information each received packet has, from an identifier (PID) each packet has, in order to acquire the information. However, as for SI, the receiving side does not have to always acquire it. For example, the receiving side may require SI only when the SI has been updated. In this case, whether SI has been updated or not is identified from a history number (version) added to the SI.

It is also possible to mix multiple pieces of SI in one packet, and multiple pieces of SI may be transmitted with a packet with the same PID. In this case, the table number added to SI is used to identify SI.

Hereinafter, the data structure used when SI is transmitted is referred to as a "section", and data transmitted with a section is referred to as "section data". The method of transmitting multiple pieces of SI mixed in one packet is called multi-section transmission or the like.

Accordingly, in packet decoding processing by the receiving side, at least the following two types of filtering are required.

(1) Filtering for extracting a desired packet from received packets based on a PID (hereinafter referred to as "PID filtering"); and (2) filtering for extracting desired section data if an extracted packet has a section (hereinafter referred to as "section filtering").

A filter used for section filtering is referred to as a "section filter". Extraction conditions are set in advance in the section filter, and such section data as satisfies the extraction conditions is extracted from a packet extracted by PID filtering. As the extraction conditions, an "AND condition" (also referred to as a "reference condition" or the like) for specifying the pattern of section data to be extracted and a "MASK condition" for excluding a part of the AND condition are set. Section data is extracted from a packet based on the AND condition and the MASK condition (for example, Japanese Patent Laid-Open No. 2000-22747).

A filter used for PID filtering is referred to as a "PID filter".

Recently, it has become possible to further specify a "NOT condition" as an extraction condition in order to extract a pattern which is unmatched with a part of an AND condition.

As operation specification of a section filter, the following two are conceivable according to the usage of the NOT condition.

Specification 1: To detect a pattern in which at least 1 bit specified with a NOT condition is unmatched with an AND condition.

Specification 2: To detect a pattern in which all the bits specified with a NOT condition are unmatched with an AND condition.

In section filtering, there are two cases: a case where extraction of section data based on the specification 1 is required and a case where extraction of section data based on the specification 2 is required.

However, when a section filter which operates in accordance with the specification 1 is used, it is not possible to extract section data in which all the bits specified with a NOT condition are unmatched with an AND condition by performing section filtering once.

Meanwhile, when a section filter which operates in accordance with the specification 2 is used, it is not possible to extract section data in which at least one bit specified with a NOT condition is unmatched with an AND condition by performing section filtering once.

Furthermore, in the case of a section filter to which a NOT condition is applied, one type of operation specification must be fixed for one section filter.

As a result, in order to extract desired section data, section filters with multiple specifications are required, or it is required to perform section filtering multiple times. That is, there is a problem that the circuit scale of a receiving apparatus is increased or that the number of section data which can be processed per unit time is decreased.

SUMMARY OF THE INVENTION

A receiving apparatus according to an aspect of the present invention is a receiving apparatus configured to extract particular information from multiple pieces of information included in a received signal, the receiving apparatus including: an extraction condition storage circuit configured to store a first extraction condition for detecting a particular data pattern which identifies the particular information and a second extraction condition for supplementing the first extraction condition; a grouping circuit configured to divide and collect the first extraction condition based on the second extraction condition to output multiple group extraction conditions; and a determination circuit configured to determine whether or not the data patterns of the multiple pieces of information satisfy the multiple group extraction conditions.

According to another aspect of the present invention, a receiving method for extracting particular information from multiple pieces of information included in a received signal, the receiving method comprising: storing a first extraction condition for detecting a particular data pattern which identifies the particular information and a second extraction condition for supplementing the first extraction condition; dividing and collecting the first extraction condition based on the second extraction condition to output multiple group extraction conditions; and determining whether or not the data patterns of the multiple pieces of information satisfy the multiple group extraction conditions.

BRIEF DESCRIPTION OF THE DRAWINGS

FIG. 1 is a schematic diagram showing the configuration of a receiving apparatus according to a first embodiment of the present invention;

FIG. 2 is a diagram for illustrating an example of extraction operation in section filtering (1);

FIG. 3 is a diagram for illustrating an example of extraction operation in section filtering (2);

FIG. 4 is a diagram for illustrating another example of extraction operation in section filtering (1);

FIG. 5 is a diagram for illustrating another example of extraction operation in section filtering (2);

FIG. 7 is a diagram showing an example of group extraction conditions configured by performing interpolation for the group conditions shown in FIG. 6;

FIG. 9 is a diagram showing an example of group extraction conditions configured by performing interpolation for the group conditions shown in FIG. 8;

FIG. 10 is a diagram showing an example of extraction conditions divided and collected by the receiving apparatus according to the first embodiment of the present invention;

FIG. 11 is a diagram showing an example of group extraction conditions configured by performing interpolation for group conditions shown in FIG. 10;

FIG. 13 is a diagram showing an example of extraction conditions divided and collected by the receiving apparatus according to the second embodiment of the present invention;

DETAILED DESCRIPTION OF THE INVENTION

Figure 6:
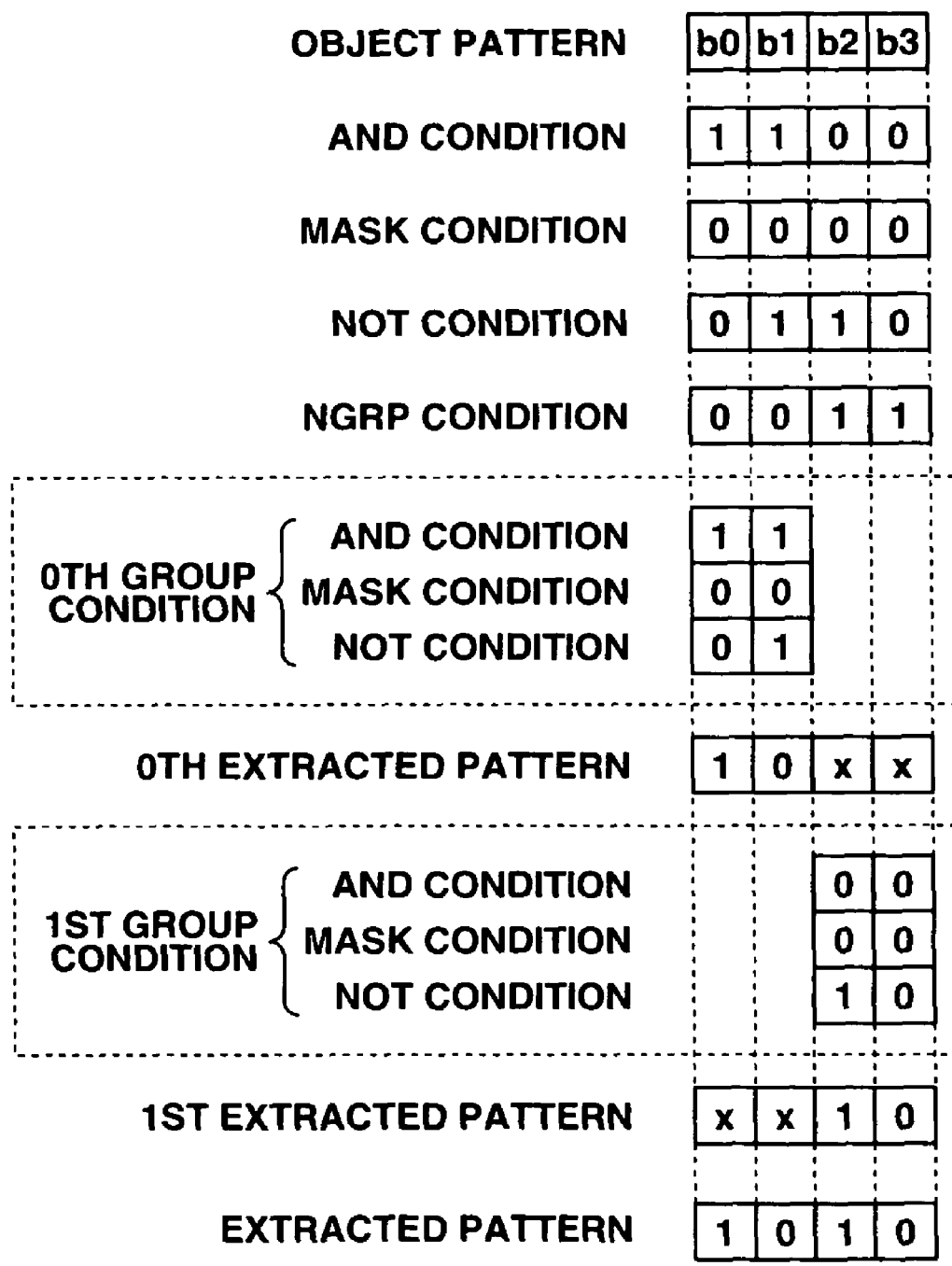
FIG. 6 is a diagram for illustrating an example of extraction conditions in section filtering by the receiving apparatus according to the first embodiment of the present invention.

Next, first to third embodiments of the present invention will be described with reference to drawings. In the description about the drawings below, the same or similar reference numerals are given to the same or similar portions.

The first to third embodiments shown below are intended to illustrate apparatuses or methods to embody the technical idea of the present invention, and the technical idea of the present invention does not limit the structure, arrangement and the like of the components to those described below. Various changes can be made in the technical idea of the present invention within the scope of the claims.

In order to facilitate understanding, description will be made with the use of the "section data" already described in the background of the invention as an example of the "information" in the claims.

First Embodiment

As shown in FIG. 1, a receiving apparatus according to the first embodiment of the present invention is provided with an antenna 2, a tuner 3, a demodulator 4, a PID filter unit 10, a section filter unit 20, a host processor 30, a video decoder 40, an audio decoder 50, a data bus 60, a memory 5, a back end processor (BEP) 6, a display unit 7 and a speaker 8. It extracts particular data from multiple data included in a received signal and decompress a video signal and an audio signal from the particular data, then it displays a video signal and sounds an audio signal. The PID filter unit 10, the section filter unit 20, the host processor 30, the video decoder 40, the audio decoder 50 and the data bus 60 can be formed on the same chip 1.

This receiving apparatus first receives a broadcast signal with the antenna 2.

The tuner 3 is connected to the antenna 2. The antenna 2 outputs the received broadcast signal as a received signal to the tuner 3.

In addition to the antenna 2, the demodulator 4 is also connected to the tuner 3. The tuner 3 converts the received signal inputted from the antenna 2 to a baseband signal and outputs it to the demodulator 4.

In addition to the tuner 3, the demodulator 4 is also connected to the PID filter unit 10. The demodulator 4 outputs a packet PT obtained by performing demodulation processing of the baseband signal inputted from the tuner 3, to the PID filter unit 10. The demodulation processing performed by the demodulator 4 is, for example, conversion from an analog signal to a digital signal, multiplex demodulation to be performed when a received signal is multiplex modulated, error-correction processing and the like.

In addition to the demodulator 4, the section filter unit 20 and the data bus 60 are also connected to the PID filter unit 10. The PID filter unit 10 extracts data required for each of subsequent circuits, from a packet PT having the same PID as a value (reference PID) preset by the host processor 30 from among packets PT inputted from the demodulator 4. The reference PID is set via the data bus 60. However, it is also possible to set it via a different route not shown in the figure. The subsequent circuits are the host processor 30, the video decoder 40 and the audio decoder 50. Data required by the video decoder 40 is referred to as "video data", and data required by the audio decoder 50 is referred to as "audio data". Data transmitted with a section among the data required by the host processor 30 is referred to as "section data" as described above, and data with a structure other than this structure is referred to as "private data".

If data extracted by the PID filter unit 10 is video data, audio data and private data, each data is outputted from the PID filter unit 10 to the data bus 60.

If data extracted by the PID filter unit 10 is section data, the data is outputted as object data OD from the PID filter unit 10 to the section filter unit 20.

The section filter unit 20 is provided with an extraction condition storage circuit 21 which stores first extraction conditions for detecting a particular data pattern identifying particular information and a second extraction condition for supplementing the first extraction conditions, a grouping circuit 22 which divides and collects the first extraction conditions based on the second extraction condition to output multiple group extraction conditions and a determination circuit 23 which determines whether or not the data patterns of multiple pieces of information satisfy the multiple group extraction conditions.

In the first embodiment, the section filter unit 20 is further provided with an extracted data output circuit 24 which outputs extracted section data to the data bus 60 and an object pattern extraction circuit 25 which extracts an object pattern OP from object data OD.

Section data to be filtered in section filtering is "object data", and a data pattern to be a part or all of object data which is used for determination in section filtering is an "object pattern".

A data pattern which satisfies extraction conditions in section filtering is referred to as an "extracted pattern", and section data extracted by section filtering is referred to as "extracted data".

That is, object data having an extracted pattern to be an object pattern OP which satisfies extraction conditions is extracted as extracted data by section filtering.

The extraction condition storage circuit 21 is provided with an AND condition storage unit 211, a MASK condition storage unit 212, a NOT condition storage unit 213 and an NGRP condition storage unit 214. The AND condition storage unit 211 can store multiple AND conditions. The MASK condition storage unit 212 can store multiple MASK conditions. The NOT condition storage unit 213 can store multiple NOT conditions. The NGRP condition storage unit 214 can store multiple NGRP conditions. The "NGRP condition" is a condition which is set to specify a group number to supplement the usage of a NOT condition. The details of the NGRP condition will be described later. The storage area of the same storage device may be divided and used as the AND condition storage unit 211, the MASK condition storage unit 212, the NOT condition storage unit 213 and the NGRP condition storage unit 214. Alternatively, the storage areas of separate storage devices may be used. As the storage device, various storage units such as a register can be adopted.

Each of the AND condition storage unit 211, the MASK condition storage unit 212, the NOT condition storage unit 213 and the NGRP condition storage unit 214 is connected to the grouping circuit 22.

Each of extraction conditions, an AND condition, a MASK condition, a NOT condition and an NGRP condition for a section filter used in section filtering is inputted to the extraction condition storage circuit 21 by an extraction condition setting signal SC via the data bus 60 so that they can be set from the host processor 30. Each of the extraction conditions is stored in the extraction condition storage circuit 21 based on the extraction condition setting signal SC. The extraction conditions may be set from the host processor 30 via a route different from the data bus 60, which is not shown in the figure. When section filtering is performed, extraction conditions set for a section filter to be used are selected, and each of the selected extraction conditions is outputted from the extraction condition storage circuit 21 to the grouping circuit 22.

The grouping circuit 22 divides and collects the AND condition, the MASK condition and the NOT condition (these three conditions are to be first extraction conditions) inputted from the extraction condition storage circuit 21, based on the NGRP condition (this condition is to be a second extraction condition) to output the 0th group extraction conditions J0 to the n-th group extraction conditions Jn to the determination circuit 23. At least one group number is set for an object pattern.

The PID filter unit 10 and the determination circuit 23 are connected to the object pattern extraction circuit 25. In the object pattern extraction circuit 25, an object pattern OP to be used for determination in section filtering is extracted from object data OD inputted from the PID filter unit 10, and it is outputted to the determination circuit 23.

The determination circuit 23 is provided with a 0th determination unit 230 to an n-th determination unit 23n and a comprehensive determination unit 2301 (n: natural number). The grouping circuit 22 and the object pattern extraction circuit 25 are connected to the 0th determination unit 230 to the n-th determination unit 23n. The 0th determination unit 230 to the n-th determination unit 23n determine whether or not an object pattern OP inputted from the object pattern extraction circuit 25 satisfies the 0th group extraction conditions J0 to the n-th group extraction conditions Jn inputted from the grouping circuit 22.

For example, if the object pattern OP satisfies the 0th group extraction conditions, then the 0th determination unit 230 notifies TRUE to the comprehensive determination unit 2301 as a determination result. On the other hand, if the object pattern OP does not satisfy the 0th group extraction conditions, then the 0th determination unit 230 notifies FALSE to the comprehensive determination unit 2301 as a determination result.

The 0th determination unit 230 to the n-th determination unit 23n and the extracted data output circuit 24 are connected to the comprehensive determination unit 2301. If TRUE is notified from all of the 0th determination unit 230 to the n-th determination unit 23n, then the comprehensive determination unit 2301 notifies MATCH to the extracted data output circuit 24 as a comprehensive determination result. If FALSE is notified from any one of the determination units, UNMATCH is notified as a comprehensive determination result.

When the above determination results are interpreted as digital signals, "TRUE", "FALSE", "MATCH" and "UNMATCH" can be identified according to the value of a signal outputted from each portion. For example, if the value of an output signal from the 0th determination unit 230 to the n-th determination unit 23n after determination is "1", then it can be identified as "TRUE". If the value is "0", then it can be identified as "FALSE". Similarly, the value of an output signal ST from the comprehensive determination unit 2301 after comprehensive determination is "1", then it can be identified as "MATCH". If the value is "0", it can be identified as "UNMATCH". However, the present invention does not limit the specification of a signal which notifies a determination result only to the above specifications, and various specifications can be applied.

In addition to the comprehensive determination unit 2301, the PID filter unit 10 and the data bus 60 are also connected to the extracted data output circuit 24. If the overall determination result notified from the comprehensive determination unit 2301 is MATCH, then the extracted data output circuit 24 outputs the object data OD inputted from the PID filter unit 10 to the data bus 60 as extracted data ED. If the comprehensive determination result is UNMATCH, then the object data OD is not outputted to the data bus 60 as extracted data ED. That is, extracted data ED which is outputted from the extracted data output circuit 24 when the comprehensive determination result is MATCH is the section data extracted by section filtering.

In addition to the PID filter unit 10, the section filter unit 20, the host processor 30, the video decoder 40, the audio decoder 50 and the memory 5 are also connected to the data bus 60. Various data outputted from the PID filter unit 10 or the section filter unit 20 are handed to the subsequent circuits via the data bus 60 as described below.

If section data is included in a packet PT, then the section data extracted by the section filter unit 20 is stored in a section data storage area set in the memory 5, which is not shown in the figure, via the data bus 60. The host processor 30 reads the section data from the memory 5 when necessary.

Meanwhile, if video data, audio data or private data is included in a packet PT, it is identified only by the PID of the packet PT. Therefore, the PID filter unit 10 directly outputs the data to the data bus 60 as described above. The video data, the audio data and the private data extracted by the PID filter unit 10 is stored in a video data storage area, an audio data storage area and a private data storage area set in the memory 5, which are not shown in the figure, respectively. Each of the video decoder 40, the audio decoder 50 and the host processor 30 reads data it needs, from the memory 5 when necessary.

It is also possible to hand the various data, the video data, the audio data, the private data and the section data, to the subsequent-stage circuits, the video decoder 40, the audio decoder 50 and the host processor 30, respectively, not via the memory 5. For example, it is possible to separately provide routes to directly hand the various data to the respective subsequent circuits requiring the respective data, though it is not shown in the figure. Thus, the present invention does not limit the method of handing the various data extracted by the respective filter units only to the route via the memory 5 described above, and various methods can be applied.

In addition to the data bus 60, the BEP 6 is also connected to the video decoder 40. The video decoder 40 decodes video data inputted via the data bus 60, converts obtained video information to a video signal and outputs it to the BEP 6.

In addition to the video decoder 40, the display unit 7 is also connected to the BEP 6. The BEP 6 performs various image processings, such as color correction, for the video signal inputted from the video decoder 40 and outputs the image-processed video signal to the display unit 7.

The display unit 7 displays the image-processed video signal inputted from the BEP 6 as a picture.

In addition to the data bus 60, the speaker 8 is also connected to the audio decoder 50. The audio decoder 50 decodes audio data inputted via the data bus 60, converts obtained audio information to an audio signal and outputs it to the speaker 8.

The speaker 8 reproduces the audio signal inputted from the audio decoder 50 as a voice.

In the video decoder 40 or in the audio decoder 50, it is also possible to temporarily store an operation result and the like during decoding processing in a work area of the memory 5, which is not shown in the figure, via the data bus 60. The present invention does not limit the purpose of the memory 5 only to handing of extracted data. The memory 5 can be used for various purposes by each circuit connected to the data bus 60.

Next, description will be made on a method for detecting a particular data pattern with extraction conditions set for a section filter, with reference to FIGS. 2 to 9. In order to facilitate understanding, description will be made on the assumption that an object pattern OP is configured by four bits. Hereinafter, the i-th bit or bit string from the left of a bit pattern is referred to as a block, and the i-th bit is represented by "bi-1, and the i-th bit string is represented by "di-1" (i: natural number). For example, the leftmost bit (or block) of a bit pattern can be described as "$b_0$". In FIGS. 2 to 9, one area surrounded by a square is a block (the same for FIGS. 10 to 14).

A set of more than one block (hereinafter referred to as a block string) is indicated by blocks separated by commas "," from one another and surrounded by [ ]". For example, a bit pattern configured by the first, third and fourth bits from the left can be described as a block string [$b_0$, $b_3$, $b_4$].

Furthermore, the description "[$b_1$, $b_3$]=[0,1]" indicates such a pattern that the left-hand side has the values in the right-hand side, that is, a pattern in which the values of the blocks $b_1$ and $b_3$ are 0 and 1, respectively.

When only the right-hand side, for example, "[0,0,1,1]" is described, this indicates a pattern of a block area in which the leftmost and subsequent blocks are continuously arranged (object pattern OP) or an extraction condition pattern corresponding to the block area (hereinafter referred to as a "condition pattern"), if not otherwise specified. In this case, an object pattern OP or a condition pattern in which the block $b_0$, the block $b_1$, the block $b_2$ and the block $b_3$ are "0", "0", "1" and "1", respectively.

When a particular data pattern is detected by a section filter, an AND condition, a MASK condition and a NOT condition are used as extraction conditions. The basic operation of the section filter is to notify TRUE as a determination result if an object pattern OP corresponding to the bit pattern of the AND condition is inputted.

The MASK condition is used to exclude a part or all of the bits of the AND condition from the condition pattern. In other words, it is used to detect an object pattern OP irrespective of a part or all of the bit pattern of the AND condition (on the assumption that the object pattern OP always matches to the part or all of the AND condition). In this embodiment, it is assumed that the AND condition for a bit where "1" is set as the value of the MASK condition is determined to be excluded (masked). However, in the present invention, the value which makes exclusion determination effective is not limited to "1". That is, exclusion determination may be effective when the value is "0". Hereinafter, it is assumed that exclusion determination is effective for a bit of an AND condition where "1" is set as the MASK condition, and that exclusion determination is ineffective for a bit of an AND condition where "0" is set, if not otherwise specified.

For example, in the case where the AND condition is [1,1,0,0] and the MASK condition is [0,0,0,1], an object pattern OP in which the bit of the block $b_3$ of the AND condition is masked, specifically an object pattern OP [1,1,0,x] is to be detected. The "x" indicates "0" or "1" (hereinafter the same). That is, if [1,1,0,0] or [1,1,0,1] is inputted as an object pattern OP, TRUE is notified as a determination result.

The NOT condition is used to detect an object pattern OP which is unmatched with a part or all of the bit pattern of the AND condition. In this embodiment, a bit where "1" is set as the value of the NOT condition is determined to be unmatched with the AND condition. However, in the present invention, the value which makes unmatching determination effective is not limited to "1". That is, unmatching determination may be effective when the value is "0". Hereinafter, it is assumed that unmatching determination is effective for a bit of an AND condition where "1" is set as the NOT condition, and that unmatching determination is ineffective for a bit of an AND condition where "0" is set, if not otherwise specified.

For example, the AND condition and the NOT condition are set as [1,1,0,0] and [0,1,1,0], respectively. In this case, object patterns OP in which the block string [$b_1$,$b_2$] is unmatched with the AND condition among object patterns OP in which the block string [$b_0$,$b_3$] matches with the AND condition, specifically, object patterns OP in which [$b_0$,$b_3$]=[1,0] and [$b_1$,$b_2$]=[0,0], [0,1] or [1,1] are to be detected. That is, if [1,0,0,0], [1,0,1,0] or [1,1,1,0] is inputted as an object pattern OP, TRUE is notified as a determination result.

Apparent from the above description, a MASK condition and a NOT condition are set as supplementary conditions dependent on an AND condition. A MASK condition and a NOT condition may be used at the same time. In this case, as for a bit where both of the MASK condition and the NOT condition are set as "1", the following two specifications are conceivable according to order of determination. Any of the specifications will not depart from the object, the configuration of circuits and the like of the present invention. Therefore, in the present invention, any of the specifications is possible, and the specification to be applied is not limited.

Specification 1: Determination with the use of the MASK condition is performed first, and it is first determined that the bit matches with the AND condition. After that, as a result of performing unmatching determination with the use of the NOT condition, FALSE is determined as the final determination result about the bit because the bit has been already determined to match the AND condition.

Specification 2: Determination with the use of the NOT condition is performed first, and it is first determined whether the bit is unmatched with the AND condition. After that, as a result of performing exclusion determination with the use of the MASK condition, TRUE is determined as the final determination result about the bit because the bit can be determined to match the AND condition irrespective of the result of the unmatching determination performed earlier.

Hereinafter, description will be made in accordance with the specification 1 described above, if not otherwise specified.

As already described above, the following problems are caused when a NOT condition is applied.

The first problem is that, in the case of using a section filter in which a NOT condition is used as shown in the specification 1, it is not possible to extract such a bit pattern that all of the bits where "1" is set as the NOT condition are unmatched with the AND condition, by performing section filtering once.

For example, an example will be shown in which, with the use of a NOT condition as shown in the specification 1, such object patterns OP that both of the blocks $b_1$ and $b_2$ in a block string $[b_0,b_1,b_2,b_3]$ are unmatched with an AND condition are extracted as extracted patterns.

First, as shown in FIG. 2, the AND condition, the MASK condition and the NOT condition are set as [1,1,0,0], [0,1,0,0] and [0,1,1,0], respectively, and section filtering is executed for a block string $[b_0,b_1,b_2,b_3]$ to be an object pattern OP. As a result, [1,1,1,0] and [1,0,1,0] are extracted as extracted patterns.

Next, as shown in FIG. 3, the AND condition, the MASK condition and the NOT condition are set as [1,1,0,0], [0,0,1,0] and [0,1,1,0], respectively, and section filtering is executed for the extracted patterns [1,1,1,0] and [1,0,1,0] which have been extracted before. As a result, the object pattern OP [1,0,1,0], in which both of the blocks $b_1$ and $b_2$ in the block string $[b_0,b_1,b_2,b_3]$ are unmatched with the AND condition [1,1,0,0], is extracted as an extracted pattern.

That is, in the case of using a section filter in which a NOT condition is used as shown in the specification 1, the following problems are caused when such a bit pattern is extracted that all of the bits for which unmatching determination is specified by the NOT condition are unmatched with the AND condition.

In order to perform extraction with the use of only one section filter to suppress the circuit scale, it is necessary to execute section filtering the same number of times as the number of bits (blocks) for which unmatching determination is specified by the NOT condition. As a result, the number of section data which can be processed per unit time is decreased.

Alternatively, in order to perform extraction by executing section filtering once for improvement of the processing speed, it is necessary to serially and simultaneously use the same number of section filters as the number of bits (blocks) for which unmatching determination is specified by the NOT condition. As a result, the circuit scale required for the section filtering is increased.

The second problem is that, in the case of using a section filter in which a NOT condition is used as shown in the specification 2, it is not possible to extract a bit pattern that at least one bit among bits where "1" is set as the NOT condition is unmatched with the AND condition, by performing section filtering once.

For example, an example will be shown in which, with the use of a NOT condition as shown in the specification 2, such object patterns OP that at least one of the blocks $b_1$ and $b_2$ in a block string $[b_0,b_1,b_2,b_3]$ is unmatched with an AND condition are extracted as extracted patterns.

First, as shown in FIG. 4, there is prepared a section filter in which the AND condition, the MASK condition and the NOT condition are set as [1,1,0,0], [0,0,1,0] and [0,1,0,0], respectively. Section filtering is executed for the block string $[b_0,b_1,b_2,b_3]$ to be an object pattern OP, with the use of this section filter. As a result, the object patterns OP [1,0,0,0] and [1,0,1,0], in which only the block $b_1$ is unmatched with the AND condition [1,1,0,0] in the block string $[b_0,b_1,b_2,b_3]$, are extracted as extracted patterns.

At the same time, as shown in FIG. 5, there is prepared a section filter in which the AND condition, the MASK condition and the NOT conditions are set as [1,1,0,0], [0,1,0,0] and [0,0,1,0], respectively. Section filtering is executed for the block string $[b_0,b_1,b_2,b_3]$ to be an object pattern OP, with the use of this section filter. As a result, the object patterns [1,1,1,0] and [1,0,1,0], in which only the block $b_2$ is unmatched with the AND condition [1,1,0,0] in the block string $[b_0,b_1,b_2,b_3]$, are extracted as extracted patterns.

Accordingly, by using two section filters, the object patterns OP [1,0,0,0], [1,1,1,0] and [1,0,1,0], in which at least one bit of the blocks $b_1$ and $b_2$ is unmatched with the AND condition [1,1,0,0] in the block string $[b_0,b_1,b_2,b_3]$, are extracted as extracted patterns. However, the same object pattern [1,0,1,0] is extracted as an extracted pattern by both section filterings.

That is, in the case of using a section filter in which a NOT condition is used as shown in the specification 2, the following problem is caused when such a bit pattern is extracted that at least one bit among bits for which unmatching determination is specified by the NOT condition is unmatched with the AND condition.

In order to perform extraction by executing section filtering once for improvement of the processing speed, it is necessary to in parallel and simultaneously use the same number of section filters as the number of bits (blocks) for which unmatching determination is specified by the NOT condition. As a result, the circuit scale required for the section filtering is increased. In addition, the same bit pattern is detected by multiple section filters, and the efficiency of the section filtering is decreased.

Alternatively, in order to perform extraction with the use of only one section filter to suppress the circuit scale, it is necessary to execute section filtering the same number of times as the number of bits (blocks) for which unmatching determination is specified by the NOT condition. As a result, the number of section data which can be processed per unit time is decreased. In addition, the same bit pattern is detected by multiple section filterings, and the efficiency of the section filtering is decreased.

As described above, in section filtering using a section filter to which a NOT condition is applied, the usage of a NOT condition is limited to any of the specifications 1 and 2. As a result, there is a problem that use of multiple section filters or execution of section filtering more than once may be required according to a data pattern to be identified.

The receiving apparatus shown in FIG. 1 solves the above problems by setting an NGRP condition to perform section filtering.

Here, the NGRP condition will be described first. The NGRP condition is used to set a number for each block of an object pattern OP. The number set by the NGRP condition is hereinafter referred to as a "group number". For example, if

[0,0,1,1] is set as an NGRP condition, the group number of the block string [$b_0,b_1$] is "0", and the group number of [$b_2,b_3$] is "1". Extraction conditions are also divided for respective group numbers, and collected for each group number as group extraction conditions for block strings with the same group number.

The 0th group extraction conditions J0 to the n-th group extraction conditions Jn shown in FIG. 6 are group extraction conditions collected for the block strings with the group numbers 0 to n.

For example, consideration will be made on the case of extracting such a pattern that, in a four-bit block string [$b_0, b_1, b_2, b_3$] to be an object pattern OP, the blocks $b_0$ and $b_3$ are "1" and "0", respectively, and the block string [$b_1,b_2$] is unmatched with [1,0].

Depending on how a group number (NGRP condition) is set for the block string [$b_1,b_2$], it is possible to extract "an object pattern OP in which both blocks are unmatched with the AND condition" or "an object pattern OP in which at least one of the blocks is unmatched with the AND condition" by executing section filtering using a section filter in which a NOT condition is used as shown in the specification 1, once.

An example of section filtering will be shown below in which a particular pattern satisfying extraction conditions is extracted as an extracted pattern from the four-bit object pattern OP described above, by the receiving apparatus 1 to which the NGRP condition shown in FIG. 6 is applied.

First, as shown in FIG. 6, as extraction conditions, the AND condition, the MASK condition and the NOT condition are [1,1,0,0], [0,0,0,0] and [0,1,1,0], respectively.

The host processor 30 sets these extraction conditions for the extraction condition storage circuit 21 via the data bus 60. The extraction condition storage circuit 21 stores the AND condition, the MASK condition, the NOT condition and the NGRP condition inputted from the data bus 60 in the AND condition storage unit 211, the MASK condition storage unit 212, the NOT condition storage unit 213 and the NGRP condition storage unit 214, respectively, based on an extraction condition setting signal SC. The stored extraction conditions are outputted to the grouping circuit 22. The grouping circuit 22 divides the extraction conditions outputted from the extraction condition storage circuit 21 based on group numbers indicated by the NGRP condition, and collects, for each group number, extraction conditions with the same group number as group conditions. The group conditions divided and collected for each of the group numbers 0 to n are outputted to the determination circuit 23 as the 0th group extraction conditions to the n-th group extraction conditions Jn, respectively.

The object pattern extraction circuit 25 outputs the block string [$b_0,b_1,b_2,b_3$] to the determination circuit 23 as an object pattern OP.

In the determination circuit 23, it is first determined by the 0th determination unit 230 to the n-th determination unit 23$n$ whether or not an object pattern OP inputted from the object pattern extraction circuit 25 satisfies the 0th group extraction conditions to the n-th group extraction conditions Jn inputted from the grouping circuit 22, and a result of the determination is notified to the comprehensive determination unit 2301. Then, at the comprehensive determination unit 2301, comprehensive determination is made on each of the determination results notified from the 0th determination unit 230 to the n-th determination unit 23$n$.

Here, description will be made on two specific examples (a) and (b) of the detailed operation performed at the grouping circuit 22 to the determination circuit 23. In order to facilitate understanding, the group number which can be set for each block by the NGRP condition is limited to only "0" and "1". That is, it is assumed that the determination circuit 23 is configured only by the 0th determination unit 230, the first determination unit 231 and the comprehensive determination unit 2301.

(a) In the case of extracting a pattern in which all blocks are unmatched with the AND condition First, description will be made on the case of extracting such a pattern that all of blocks for which unmatching determination is specified by the NOT condition are unmatched with the AND condition.

As shown in FIG. 6, [0,0,1,1] is set as an NGRP condition for the object pattern OP [$b_0,b_1,b_2,b_3$]. That is, the group numbers "0" and "1" are set for the block strings [$b_0,b_1$] and [$b_2,b_3$], respectively.

If a set of extraction conditions applied to a block or block string with a group number "k" is assumed to be "the k-th group conditions" (k: an integer equal to or above 0; hereinafter the same), then the AND condition, the MASK condition and the NOT condition are [1,1], [0,0] and [0,1], respectively, in the 0th group conditions corresponding to the block string [$b_0,b_1$], and the conditions are [0,0], [0,0] and [1,0], respectively, in the first group conditions corresponding to the block string [$b_2,b_3$].

That is, the 0th determination unit 230 determines whether or not the block string [$b_0,b_1$] of the object pattern OP satisfies the 0th group conditions, and notifies TRUE if it satisfies them, and FALSE if it does not satisfy them, to the comprehensive determination unit 2301 as a result of the determination.

The first determination unit 231 determines whether or not the block string [$b_2,b_3$] of the object pattern OP satisfies the first group conditions, and notifies TRUE if it satisfies them, and FALSE if it does not satisfy them, to the comprehensive determination unit 2301 as a result of the determination result.

Here, consideration will be made on such an object pattern OP that a determination result is to be TRUE. An object pattern OP which satisfies the 0th group conditions and an object pattern which satisfies the first group conditions can be indicated as the 0th extracted pattern [1,0,x,x] and the first extracted pattern [x,x,1,0], respectively.

Thus, such an object pattern OP that a comprehensive determination result by the comprehensive determination unit 2301 is to be "MATCH" has a bit string which is determined to be TRUE by the 0th determination unit and the first determination unit. In other words, it has a bit string included in both of the 0th extracted pattern and the first extracted pattern. That is, the object pattern OP [1,0,1,0] is the extracted pattern.

Thus, section filtering equivalent to the section filtering already described with reference to FIGS. 2 and 3 can be realized only by using one section filter once.

In the extraction operation shown in FIG. 6, the four-bit block string [$b_0,b_1,b_2,b_3$] is inputted as an object pattern OP from the object pattern extraction circuit 25 into the 0th determination unit 230 and the first determination unit 231. Therefore, it is necessary that the bit length of the 0th group extraction conditions J0 and the first group extraction conditions J1, which are to be compared with, is also four bits. In other words, for the k-th group extraction conditions, it is necessary to interpolate extraction conditions for blocks other than the blocks with the group number "k" according to the number of bits of the object pattern OP.

In the specific example (a), it is necessary to perform interpolation for the extraction conditions corresponding to the blocks $b_2$ and $b_3$ of the 0th group conditions, in the 0th group extraction conditions J0, and for the extraction conditions corresponding to the blocks $b_0$ and $b_1$ of the first group conditions, in the first group extraction conditions J1.

As the value to be interpolated, such a value that the determination result for the bit (block) is to be certainly TRUE can be selected. For example, the MASK condition and the NOT condition can be set as "1" and "0", respectively. By setting the Mask condition and the NOT condition as "1" and "0", respectively, exclusion determination is made on the bit (block), and the determination result is always TRUE irrespective of the AND condition.

FIG. 7 shows a specific example in which the 0th group conditions and the first group conditions shown in FIG. 6 have been interpolated with the value described above. The determination result is TRUE no matter whether the AND condition is "0" or "1". However, in FIG. 7, the AND condition is "0".

Thus, when dividing and collecting the AND condition, the MASK condition and the NOT condition outputted from the extraction condition storage circuit 21 as group conditions based on group numbers indicated by the NGRP condition, the grouping circuit 22 interpolates extraction conditions for blocks other than blocks with a relevant group number as described above. As a result of the interpolation, the AND [1,1,0,0], the MASK condition [0,0,1,1] and the NOT condition [0,1,0,0] are outputted as the 0th group extraction conditions J0 to the 0th determination unit 230, and the AND condition [0,0,0,0], the MASK condition [1,1,0,0] and the NOT condition [0,0,1,0] are outputted as the first group extraction conditions J1 to the first determination unit 231, from the grouping circuit 22.

(b) In the case of extracting a pattern in which at least one block is unmatched with the AND condition Next, description will be made on the case of extracting such a pattern that at least one of blocks for which unmatching determination is specified by the NOT condition is unmatched with the AND condition.

Figure 8:
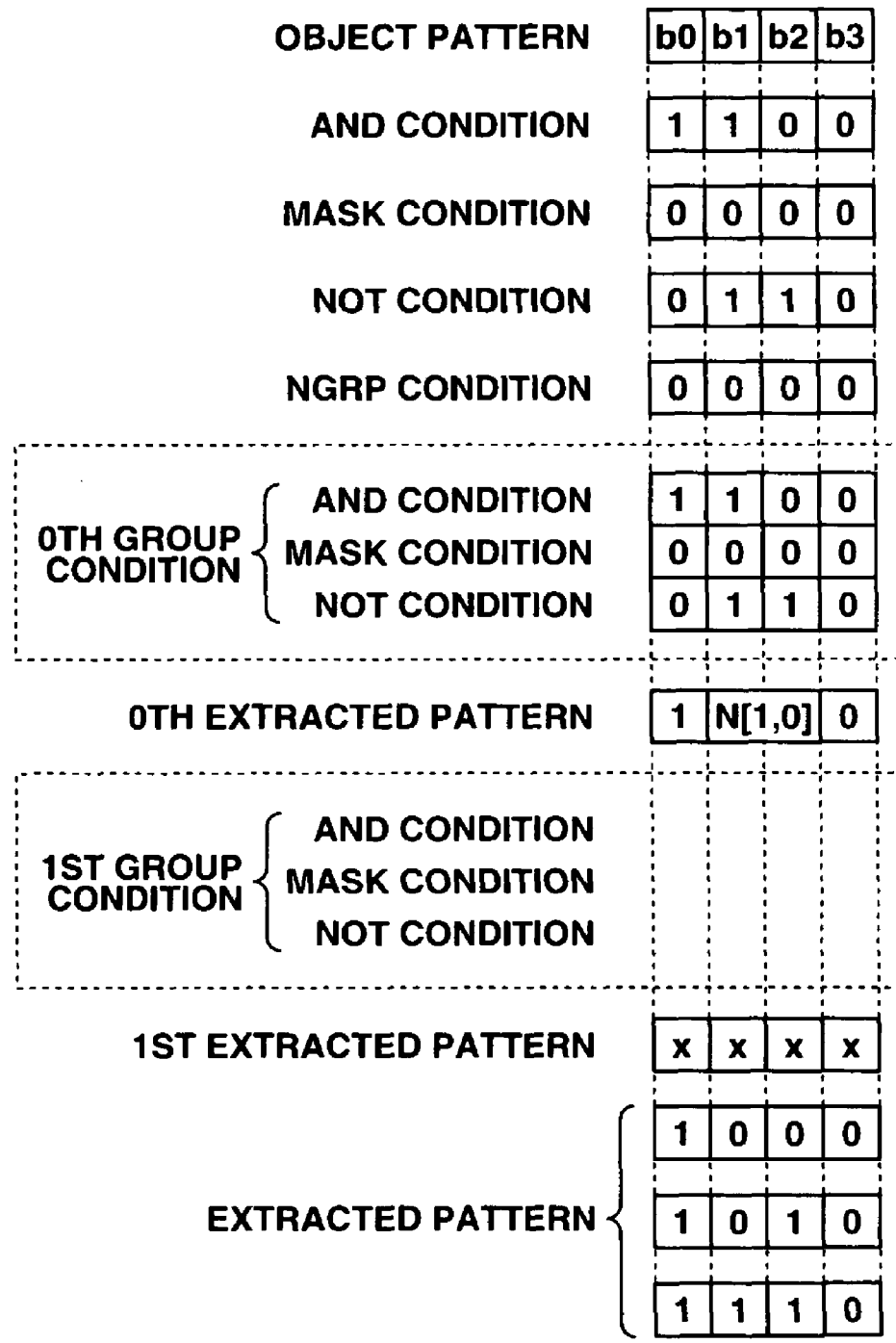
FIG. 8 is a diagram for illustrating another example of extraction operation in section filtering by the receiving apparatus according to the first embodiment of the present invention.

As shown in FIG. 8, the NGRP condition [0,0,0,0] is set for the object pattern OP [$b_0,b_1,b_2,b_3$]. That is, the group number "0" is set for the block string [$b_0,b_1,b_2,b_3$]. The same group number "0" is set for all the blocks, and there is no block for which the group number "1" is set.

In the 0th group conditions corresponding to the block string [$b_0,b_1,b_2,b_3$], the AND condition, the MASK condition and the NOT condition are [1,1,0,0], [0,0,0,0] and [0,1,1,0], respectively. In the first group conditions, there is no extraction condition to be divided and collected.

That is, the 0th determination unit 230 determines whether or not the block string [$b_0,b_1,b_2,b_3$] of the object pattern OP satisfies the 0th group conditions, and notifies TRUE if it satisfies them, and FALSE if it does not satisfy them, to the comprehensive determination unit 2301 as a result of the determination.

In this case, since the first group conditions do not exist, it is necessary for the determination circuit 23 to perform only determination by the 0th group conditions. That is, a mechanism is required which enables the comprehensive determination unit 2301 to ignore the determination result by the first determination unit 231. As this mechanism, it is conceivable to cause the determination result by the k-th determination unit 23$k$, in the case where the k-th group conditions do not exist, to be always TRUE. Accordingly, the first determination unit 231 notifies TRUE to the comprehensive determination unit 2301 as a determination result, irrespective of the value of the block string [$b_0,b_1,b_2,b_3$] of the object pattern OP.

Here, consideration will be made on such an object pattern OP that the determination result is to be TRUE. Such an object pattern OP as satisfies the 0th group conditions and such an object pattern as satisfies the first group conditions can be represented as the 0th extracted pattern [1, N[1,0], 0] and the fist extracted pattern [x,x,x,x], respectively. The "N[ ]" indicates that the value of the block string is a value other than the displayed value. The above description means that the block string [$b_1,b_2$] is a value other than [1,0], that is, any of the values [0,0], [0,1] and [1,1].

Thus, such an object pattern OP that the comprehensive determination result by the comprehensive determination unit 2301 is to be "MATCH" has a bit string for which TRUE is determined by the 0th determination unit and the first determination unit. In other words, it has a bit string included in both of the 0th extracted pattern and the first extracted pattern. That is, the object patterns OP [1,0,0,0], [1,0,1,0] and [1,1,1,1] are the extracted patterns.

Thus, section filtering equivalent to the section filtering already described with reference to FIGS. 4 and 5 can be realized only by using one section filter once.

Similarly to the case of (a) described above, in the extraction operation shown in FIG. 8 described above, it is necessary, for the k-th group extraction conditions, to interpolate extraction conditions for blocks other than the blocks with the group number "k" according to the number of bits of the object pattern OP.

In this specific example (b), the group number "0" is set for all the blocks of the object pattern OP, in the 0th group extraction conditions J0, and consequently, it is not necessary to perform interpolation for the 0th group conditions. However, in the first group extraction conditions J1, it is necessary that extraction conditions corresponding to the blocks $b_0$, $b_1$, $b_2$ and $b_3$ for the first group conditions, that is, all the blocks of the object pattern OP have been interpolated.

FIG. 9 shows a specific example in which the 0th group conditions and the first group conditions shown in FIG. 8 have been interpolated with such values that the determination result is to be TRUE similarity to the case (a). Though the determination result is to be TRUE no matter whether the AND condition is "0" or "1", the AND condition is indicated as "0" in FIG. 9.

Thus, when dividing and collecting the AND condition, the MASK condition and the NOT condition outputted from the extraction condition storage circuit 21 as group extraction conditions, based on group numbers indicated by the NGRP condition, the grouping circuit 22 interpolates extraction conditions for blocks other than blocks with a relevant group number as described above. As a result of the interpolation, the AND [1,1,0,0], the MASK condition [0,0,0,0] and the NOT condition [0,1,1,0] are outputted as the 0th group extraction conditions J0 to the 0th determination unit 230, and the AND condition [0,0,0,0], the MASK condition [1,1,1,1] and the NOT condition [0,0,0,0] are outputted as the first group extraction conditions J1 to the first determination unit 231, from the grouping circuit 22.

Similarly to the specific examples (a) and (b) described above, determination is performed on whether the object pattern for each group number satisfies each group extraction condition at the 0th determination unit 230 to the n-th determination unit 23$n$.

The determination results outputted from the 0th determination unit 230 to the n-th determination unit 23$n$ are notified to the comprehensive determination unit 2301. If all the determination results by the 0th determination unit 230 to the n-th determination unit 23$n$ are notified as TRUE, then the comprehensive determination unit 2301 notifies MATCH to the extracted data output circuit 24 as a comprehensive determination result. If at least one of the determination results outputted from the 0th determination unit 230 to the n-th determination unit 23n is notified as FALSE, then the comprehensive determination unit 2301 notifies UNMATCH to the extracted data output circuit 24 as a comprehensive determination result.

If MATCH is notified from the comprehensive determination unit 2301, then the extracted data output circuit 24 outputs the object data OD as extracted data ED to the data bus 60. On the other hand, if UNMATCH is notified, the extracted data ED is not outputted.

In the above description, an example has been shown where the object pattern OP is a bit pattern with four bits. However, for example, each block of the object pattern OP may be a bit string with one or more bits. The blocks of the object pattern OP may be bit strings with different bit lengths.

Furthermore, description has been made using an example in which group numbers which can be set by the NGRP conditions are "0" and "1". However, three or more group numbers may be set.

For example, FIG. 10 shows an example of dividing and collecting extraction conditions for an object pattern OP of a block string $[d_0,d_1,d_2,d_3,d_4,d_5,d_6,d_7]$ including eight separated blocks, based on group number indicated by an NGRP condition. In FIG. 10, the AND condition, the MASK condition and the NOT condition are set as $[a_0,a_1,a_2,a_3,a_4,a_5,a_6,a_7]$, $[m_0,m_1,m_2,m_3,m_4,m_5,m_6,m_7]$ and $[n_0,n_1,n_2,n_3,n_4,n_5,n_6,n_7]$, respectively. A block in the object pattern OP and a block in the condition pattern which have the same block number are assumed to be bit strings with the same number of bits. For example, all of $d_0$, $a_0$, $m_0$ and $n_0$ are bit strings with the same number of bits.

Group numbers which can be specified by an NGRP condition are assumed to be the four numbers, 0 to 3. A specific example thereof is [0,0,1,0,1,2,2,3].

As shown in FIG. 10, the grouping circuit 22 divides and collects extraction conditions according to group numbers as described below.

Group conditions for the block string $[d_0,d_1,d_3]$ with the group number "0" are divided and collected as the 0th group conditions.

Group conditions for the block string $[d_2,d_4]$ with the group number "1" are divided and collected as the first group conditions.

Group conditions for the block string $[d_5,d_6]$ with the group number "2" are divided and collected as the second group conditions.

Group conditions for the block string $[d_7]$ with the group number "3" are divided and collected as the third group conditions.

In the 0th group conditions, the AND condition, the MASK condition and the NOT condition are $[a_0,a_1,a_3]$, $[m_0,m_1,m_3]$ and $[n_0,n_1,n_3]$, respectively.

In the first group conditions, the AND condition, the MASK condition and the NOT condition are $[a_2,a_4]$, $[m_2,m_4]$ and $[n_2,n_4]$, respectively.

In the second group conditions, the AND condition, the MASK condition and the NOT condition are $[a_5,a_6]$, $[m_5,m_6]$ and $[n_5,n_6]$, respectively.

In the third group conditions, the AND condition, the MASK condition and the NOT condition are $[a_7]$, $[m_7]$ and $[n_7]$, respectively.

Furthermore, as shown in FIG. 11, interpolation is performed by the grouping circuit 22 for the above 0th to third group conditions. That is, as extraction conditions for blocks other than blocks with the relevant group number in the 0th to third group conditions, such a value is interpolated that a result of determination on the blocks other than the blocks with the relevant group number is to be TRUE at each of the 0th determination unit 230 to the third determination unit 233, according to the number of bits of the object pattern OP.

That is, in the grouping circuit 22 of the receiving apparatus shown in FIG. 1, interpolation is performed as shown below.

Interpolation is performed for the 0th group conditions, and the 0th group extraction conditions J0 are as follows:
    the AND condition is: $[a_0,a_1,<0>,a_3,<0,0,0,0>]$;
    the MASK condition is: $[m_0,m_1,<1>,m_3,<1,1,1,1>]$; and
    the NOT condition is: $[n_0,n_1,<0>,n_3,<0,0,0,0>]$.

Interpolation is performed for the first group conditions, and the first group extraction conditions J1 are as follows:
    the AND condition is: $[<0,0>,a_2,<0>,a_4,<0,0,0>]$;
    the MASK condition is: $[<1,1>,m_2,<1>,m_4,<1,1,1>]$; and
    the NOT condition is: $[<0,0>,n_2,<0>,n_4,<0,0,0>]$.

Interpolation is performed for the second group conditions, and the second group extraction conditions J2 are as follows:
    the AND condition is: $[<0,0,0,0,0>,a_5,a_6,<0>]$;
    the MASK condition is: $[<1,1,1,1,1>,m_5,m_6,<1>]$; and
    the NOT condition is: $[<0,0,0,0,0>,n_5,n_6,<0>]$.

Interpolation is performed for the third group conditions, and the third group extraction conditions J3 are as follows:
    the AND condition is: $[<0,0,0,0,0,0,0>,a_7]$;
    the MASK condition is: $[<1,1,1,1,1,1,1>,m_7]$; and
    the NOT condition is: $[<0,0,0,0,0,0,0>,n_7]$.

The 0th group extraction conditions J0 to the third group extraction conditions J3 are outputted to the 0th determination unit 230 to the third determination unit 233, respectively. In FIG. 11, $<0>$ indicates that all the bits in the block or block string are interpolated with "0", and $<1>$ indicates that all the bits in the block or block string are interpolated with "1".

As described above, according to the receiving apparatus according to the first embodiment of the present invention, it is possible to perform section filtering according to various usages of a NOT condition with the use of only one section filter, by setting according to the NGRP condition, for blocks for which unmatching determination is specified by the NOT condition, (i) different group numbers for the blocks in the case of extracting a pattern in which all blocks are unmatched with the AND condition; and (ii) the same group number for the blocks in the case of extracting a pattern in which at least one block is unmatched with the AND condition.

As a result, it is possible to reduce the circuit scale of a receiving apparatus mounted with a section filter to which a NOT condition is applied and improve the efficiency of section data extraction processing, in comparison with a conventional apparatus.

Second Embodiment

Figure 12:
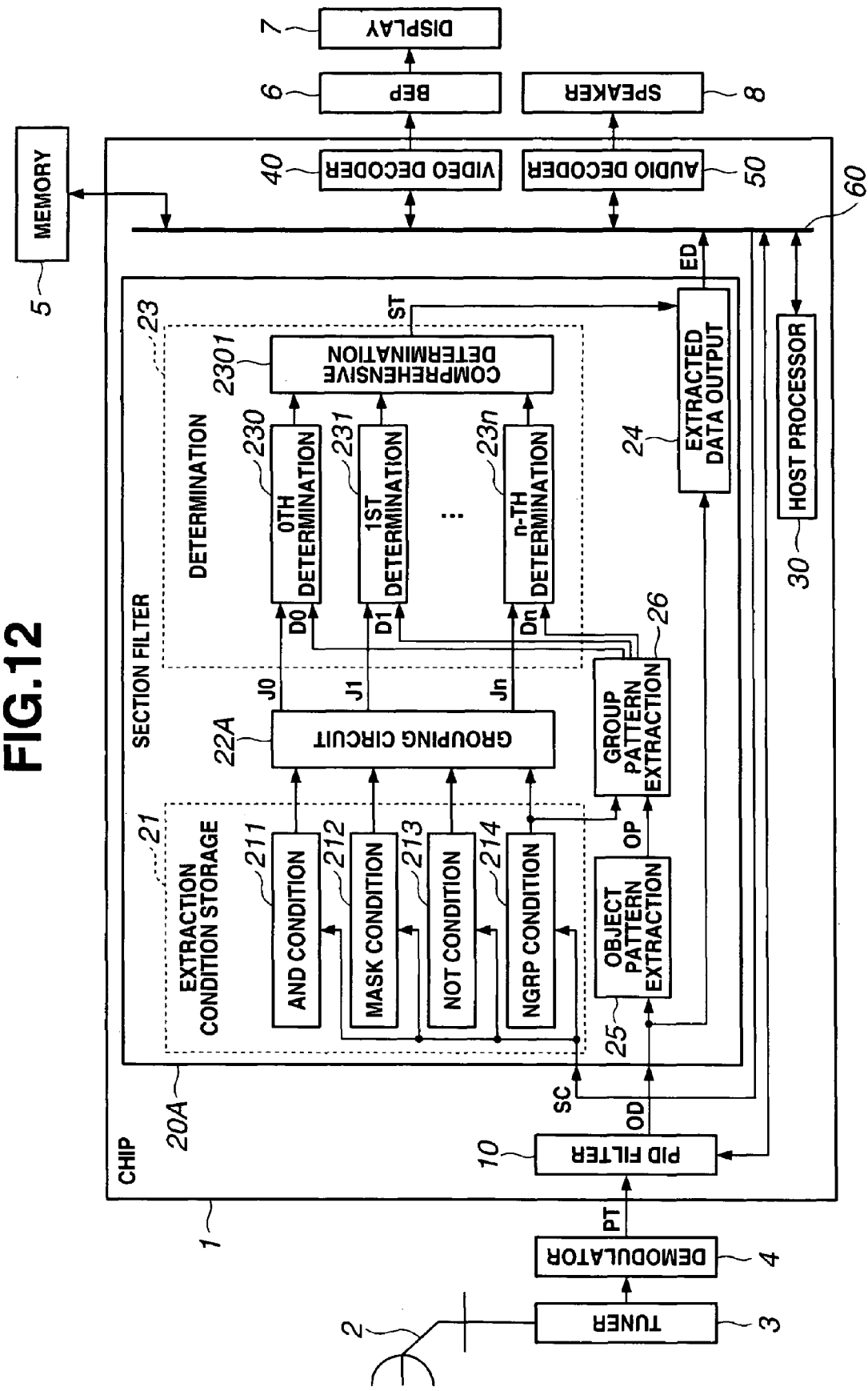
FIG. 12 is a schematic diagram showing the configuration of a receiving apparatus according to a second embodiment of the present invention.

As shown in FIG. 12, a receiving apparatus according to a second embodiment of the present invention is different from FIG. 1 in that a group pattern extraction circuit 26 is provided for the section filter unit 20, and the section filter unit is denoted by 20A. Furthermore, it is also different from FIG. 1 that the function of the grouping circuit 22 has been changed with provision of the group pattern extraction circuit 26, and that the grouping circuit is denoted by 22A. Other parts of the configuration are similar to the first embodiment shown in FIG. 1.

In the receiving apparatus shown in FIG. 12, an NGRP condition storage unit 214, an object pattern extraction circuit 25, and a 0th determination unit 230 to an n-th determination section 23n are connected to the group pattern extraction circuit 26.

The group pattern extraction circuit 26 divides and collects an object pattern OP inputted from the object pattern extraction circuit 25, based on group numbers indicated by an NGRP condition inputted from the NGRP condition storage unit 214, for each group number, with blocks with the same group number as a group pattern. The 0th group pattern D0 to the n-th group pattern Dn shown in FIG. 11 are group patterns in which blocks with the group number 0 to the group number n are collected, respectively.

The 0th group pattern D0 to the n-th group pattern Dn are inputted to the 0th determination unit 230 to the n-th determination unit 23n, respectively.

Similarly to FIG. 1, the 0th group extraction conditions J0 to the n-th group extraction conditions Jn obtained by the grouping circuit 22A dividing and collecting extraction conditions based on group numbers are inputted to the 0th determination unit 230 to the n-th determination unit 23n, respectively.

In the configuration in FIG. 12, there is further provided a group pattern extraction circuit configured to divide and collect the data patterns of the multiple pieces of information based on the group numbers to output multiple group patterns, and the multiple group extraction conditions and the multiple group patterns are outputted from the grouping circuit and the group pattern extraction circuit in a manner that the blocks in a group of blocks with the same group number are continuously arranged from a certain reference block position. Thereby, the interpolation processing can be eliminated.

Here, description will be made on the operation of the group pattern extraction circuit 26 and the grouping circuit 22A with the use of a specific example of an NGRP condition.

FIG. 13 shows an example of dividing and collecting extraction conditions for an object pattern OP of a block string $[d_0,d_1,d_2,d_3,d_4,d_5,d_6,d_7]$ including eight separated blocks, based on group numbers indicated by an NGRP condition. The AND condition, the MASK condition and the NOT condition are set as $[a_0,a_1,a_2,a_3,a_4,a_5,a_6,a_7]$, $[m_0,m_1,m_2,m_3,m_4,m_5,m_6,m_7]$ and $[n_0,n_1,n_2,n_3,n_4,n_5,n_6,n_7]$, respectively. A block in the object pattern OP and a block in the extraction condition which have the same block number are assumed to be bit strings with the same number of bits. For example, all of $d_0$, $a_0$, $m_0$ and $n_0$ are bit strings with the same number of bits.

Figure 14:
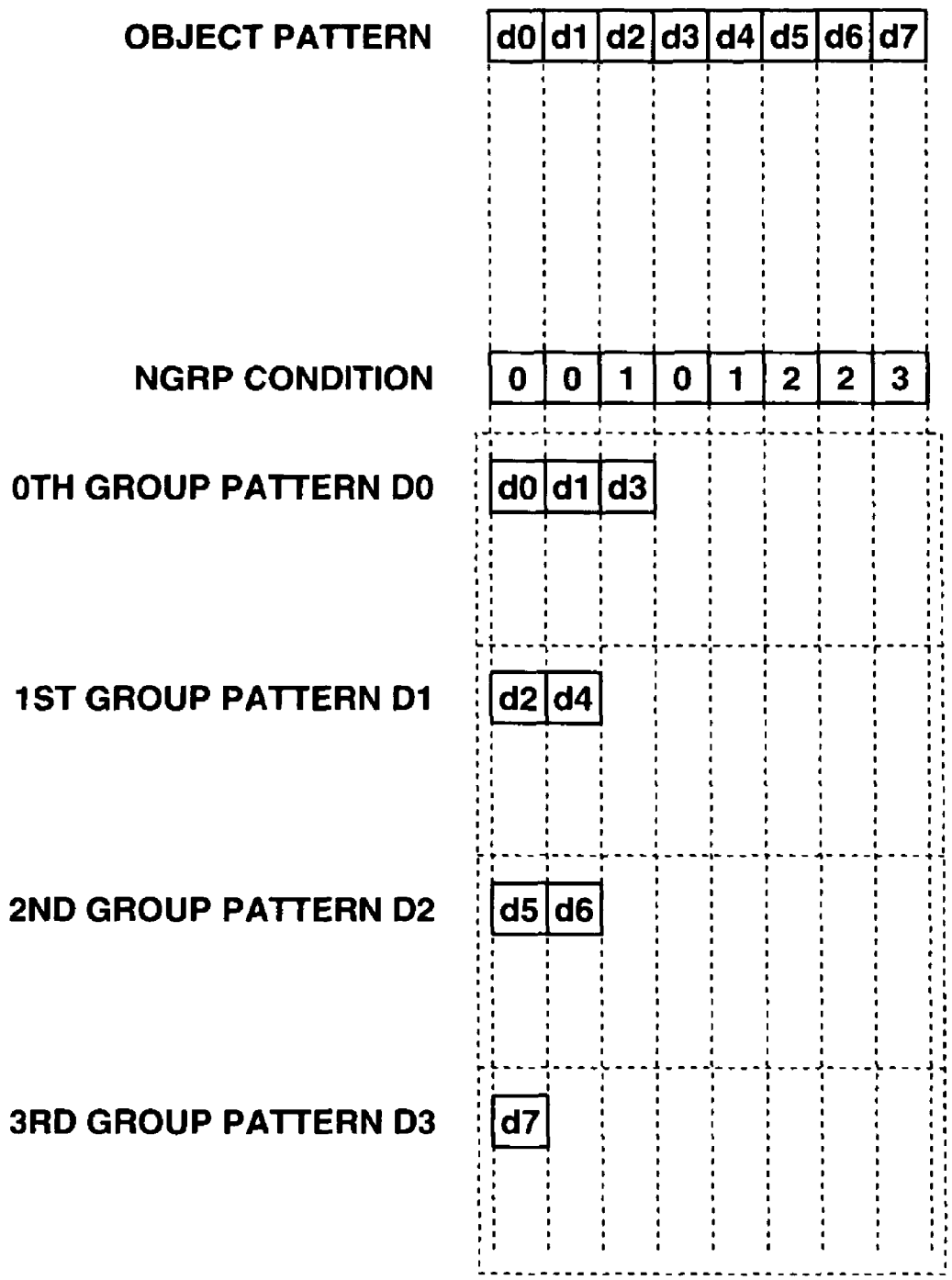
FIG. 14 is a diagram showing an example of an object pattern divided and collected by the receiving apparatus according to the second embodiment of the present invention.

FIG. 14 shows an example of dividing and collecting the object pattern OP of the block string $[d_0,d_1,d_2,d_3,d_4,d_5,d_6,d_7]$ including eight separated blocks, based on group numbers indicated by an NGRP condition.

As shown in FIGS. 13 and 14, group numbers which can be specified by an NGRP condition are the four numbers, 0 to 3. A specific example thereof is [0,0,1,0,1,2,2,3].

As shown in FIG. 13, extraction conditions are divided and collected by the grouping circuit 22A as shown below.

The extraction conditions are divided and collected to be:
group conditions for the block string $[d_0,d_1,d_3]$ with the group number "0" as the 0th group extraction conditions J0;
group conditions for the block string $[d_2,d_4]$ with the group number "1" as the first group extraction conditions J1;
group conditions for the block string $[d_5,d_6]$ with the group number "2" as the second group extraction conditions J2; and
group conditions for the block string $[d_7]$ with the group number "3" as the third group extraction conditions J3.

In the 0th group extraction conditions J0, the AND condition, the MASK condition and the NOT condition are $[a_0,a_1,a_3]$, $[m_0,m_1,m_3]$ and $[n_0,n_1,n_3]$, respectively.

In the first group extraction conditions J1, the AND condition, the MASK condition and the NOT condition are $[a_2,a_4]$, $[m_2,m_4]$ and $[n_2,n_4]$, respectively.

In the second group extraction conditions J2, the AND condition, the MASK condition and the NOT condition are $[a_5,a_6]$, $[m_5,m_6]$ and $[n_5,n_6]$, respectively.

In the third group extraction conditions J3, the AND condition, the MASK condition and the NOT condition are $[a_7]$, $[m_7]$ and $[n_7]$, respectively.

The 0th group extraction conditions J0 to the third group extraction conditions J3 are outputted to the 0th determination unit 230 to the third determination unit 233, respectively.

When the division and collection is performed, the 0th group extraction conditions J0 to the third group extraction conditions J3 are outputted in a manner that the blocks therein are continuously arranged from a certain reference block position. FIG. 13 shows that the blocks are continuously arranged with the leftmost block as the reference position. As for which block position is to be the reference position, any predetermined position may be used, and in the present invention, the reference position is not limited to the leftmost position.

As shown in FIG. 14, the object pattern OP is divided and collected by the group pattern extraction circuit 26 as shown below.

The object pattern OP is divided and collected to be:
the block string $[d_0,d_1,d_3]$ with the group number "0" as the 0th group pattern D0;
the block string $[d_2,d_4]$ with the group number "1" as the first group pattern D1;
the block string $[d_5,d_6]$ with the group number "2" as the second group pattern D2; and
the block string $[d_7]$ with the group number "3" as the third group pattern D3.

The 0th group pattern D0 to third group pattern D3 are outputted to the 0th determination unit 230 to the third determination unit 233, respectively.

When the division and collection is performed, the 0th group pattern D0 to the third group pattern D3 are outputted in a manner that the blocks therein are continuously arranged from a certain reference block position, similarly to the 0th group extraction conditions J0 to the third group extraction conditions J3. FIG. 14 shows that blocks are continuously arranged with the leftmost block as the reference position. As for which block position is to be the reference position, the same position as the position for the 0th group extraction conditions J0 to the third group extraction conditions J3 can be determined in advance, and in the present invention, the reference position is not limited to the leftmost position.

In the determination circuit 23 of the receiving apparatus shown in FIG. 12, determination is made by each of the determination units (the 0th determination unit 230 to the third determination unit 233) as shown below.

The 0th determination unit 230 determines whether or not the 0th group pattern D0 satisfies the 0th group extraction conditions J0;
the first determination unit 231 determines whether or not the first group pattern D1 satisfies the first group extraction conditions J1;
the second determination unit 232 determines whether or not the second group pattern D2 satisfies the second group extraction conditions J2; and
the third determination unit 233 determines whether or not the third group pattern D3 satisfies the third group extraction conditions J3.

Each of the determination results is outputted from the 0th determination unit 230 to the third determination unit 233 to the comprehensive determination unit 2301, as TRUE when the group extraction conditions are satisfied, and as FALSE when the group extraction conditions are not satisfied.

In FIG. 12, via a route not shown, the number of blocks for which the same group number is set by the NGRP condition is outputted, for each group number, from the grouping circuit 22A or the group pattern extraction circuit 26 to the 0th determination unit 230 to the n-th determination unit 23n. The number of blocks for each group number is inputted to the determination unit corresponding to the group number (any of the 0th determination unit 230 to the n-th determination unit 23n).

That is, the number of blocks for the group number "0" is 3 (the same number of blocks included in the 0th group pattern D0 in FIG. 14), and it is inputted to the 0th determination unit 230;

the number of blocks for the group number "1" is 2 (the same number of blocks included in the first group pattern D1 in FIG. 14), and it is inputted to the first determination unit 231;

the number of blocks for the group number "2" is 2 (the same number of blocks included in the second group pattern D2 in FIG. 14), and it is inputted to the second determination unit 232; and the number of blocks for the group number "3" is 1 (the same number of blocks included in the third group pattern D3 in FIG. 14), and it is inputted to the third determination unit 233.

In the first embodiment, it can be assumed that the same value (the total number or blocks composing the object pattern OP) is inputted into the 0th determination unit 230 to the n-th determination unit 23n as the number of blocks. Therefore, the determination circuits 23 in FIGS. 1 and 12 can be considered to have an equivalent function.

As shown in FIGS. 13 and 14, the 0th group extraction conditions J0 to the third group extraction conditions J3, and the 0th group pattern D0 to the third group pattern D3 are inputted into the 0th determination unit 230 to the third determination unit 233, respectively, in a condition that they are continuously arranged with the same block position (the leftmost position in this example) as the reference position. How many blocks from the reference position are to be covered by determination can be determined from the number of blocks which is separately inputted. Therefore, it is not necessary to perform the extraction condition interpolation processing shown in FIG. 11 at the 0th determination unit 230 to the n-th determination unit 23n, and it is determined whether or not the 0th group pattern D0 to the third group pattern D3 satisfy the 0th group extraction conditions J0 to the third group extraction conditions J3, respectively, while the inputted condition of the block string is kept.

And now, as described in the first embodiment with reference to FIGS. 8 and 9, a mechanism for ignoring determination about such group numbers as have not been set as an NGRP condition among specifiable group numbers in the event is also necessary in the second embodiment.

For example, in FIG. 13, if it is assumed that the five numbers of 0 to 4 can be included in the NGRP condition, the group number "4" is not set (used). That is, there is no block to be divided and collected for the fourth group extraction conditions J4 and the fourth group pattern D4.

However, as for such a group for which a block to be divided and collected does not exist, the number of blocks to be outputted from the grouping circuit 22A or the group pattern extraction circuit 26 is "0". Therefore, when the number of blocks is "0", the fourth determination unit 234 can notify TRUE to the comprehensive determination unit 2301 as the determination result, and when the number of blocks is a value other than "0", it can notify TRUE to the comprehensive determination unit 2301 if the fourth group pattern D4 satisfies the fourth group extraction conditions J4, and FALSE if not.

Accordingly, it is also not necessary to perform interpolation processing for group extraction conditions and group patterns for group numbers which have not been set in an NGRP condition, among specifiable group numbers.

According to the receiving apparatus according to the second embodiment of the present invention, when extraction conditions are divided and collected for each group number, the necessity of interpolation processing is eliminated by setting TRUE as a determination result for groups for which no block exists (in other words, the necessity to perform processing for interpolating such a value that the determination result is to be TRUE is eliminated), and thereby, it is possible to reduce time required for the determination processing at the 0th determination unit 230 to the n-th determination unit 23n. Other points are substantially similar to the first embodiment, and redundant description thereof will be omitted.

Third Embodiment

Figure 15:
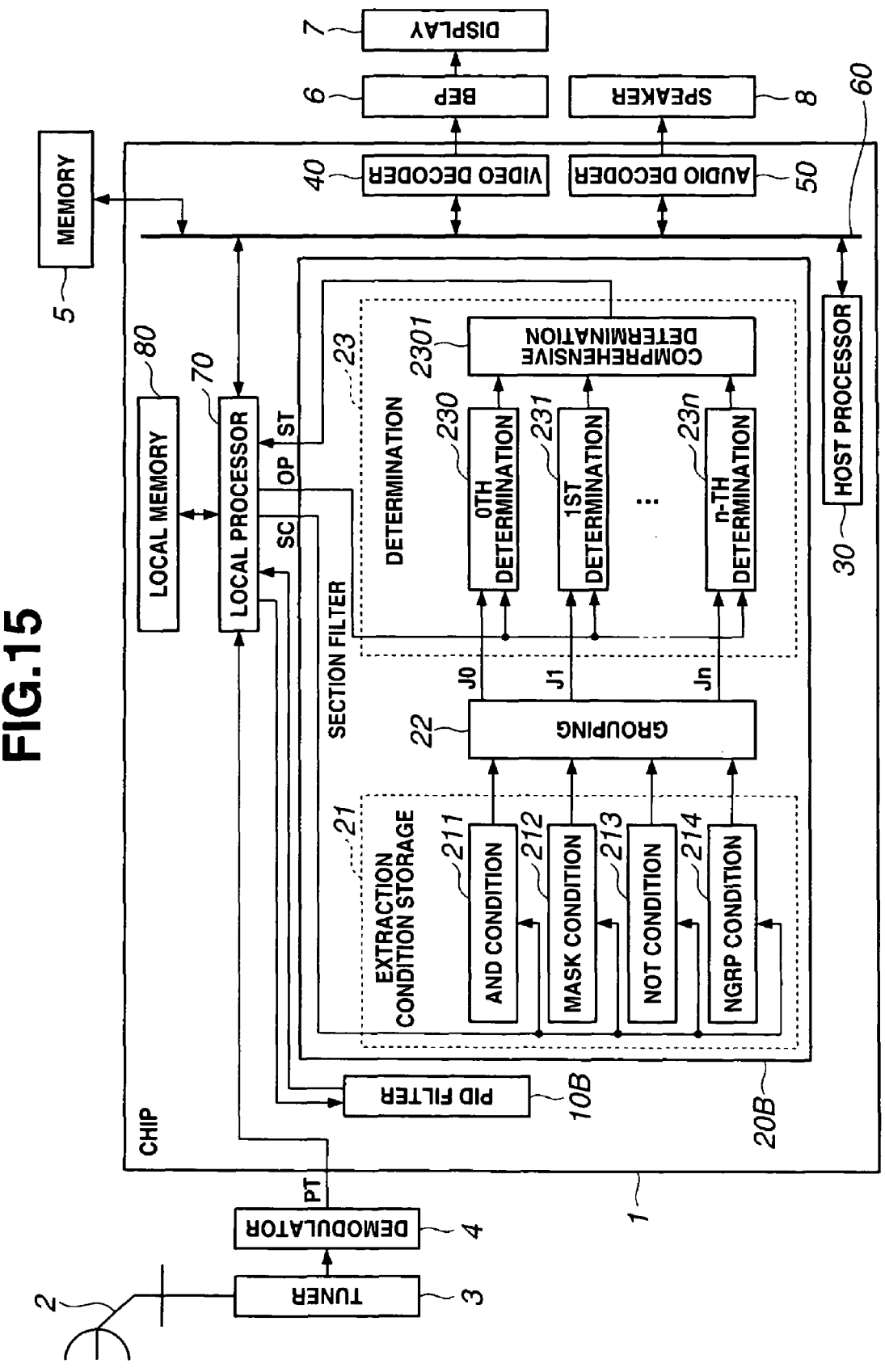
FIG. 15 is a schematic diagram showing the configuration of a receiving apparatus according to a third embodiment of the present invention.

FIG. 15 shows a receiving apparatus according to a third embodiment of the present invention. The receiving apparatus is different from FIG. 1 in that it is provided with a local processor 70 and a local memory 80. It is also a different point that, since the local processor 70 and the local memory 80 are provided, all the processing by the extracted data output circuit 24 and the object pattern extraction circuit 25 can be performed by the local processor 70, and the extracted data output circuit 24 and the object pattern extraction circuit 25 are eliminated from the section filter unit 20, and that the section filter unit 20 has been changed to a section filter unit 20B. Furthermore, it is also a different point that a part of the processing by the PID filter unit 10 can be performed by the local processor 70, the function of the PID filter unit 10 has been changed, and the PID filter unit 10 is shown as a PID filter unit 10B. Other parts of the configuration are similar to the first embodiment shown in FIG. 1.

In the receiving apparatus shown in FIG. 15, the local memory 80, the PID filter unit 10B, the section filter unit 20B, a demodulator 4 and a data bus 60 are connected to the local processor 70.

The local processor 70 temporarily stores a packet PT inputted from the demodulator 4 in a packet storage area not shown of the local memory 80. Then, the local processor 70 extracts a PID from the packet PT stored in the local memory 80 and outputs the PID to the PID filter unit 10B. The PID filter unit 10B determines whether any of at least one or more set reference PIDs has the same value as the PID inputted from the local processor 70. The reference PIDs have been set in the PID filter unit 10B in advance by the local processor 70 or a host processor 30 via a route not shown in the figure.

The PID filter unit 10B notifies a result of the determination to the local processor 70. Based on the determination result, the local processor 70 extracts a part or all of the packet PT stored in the local memory 80 as data required for the subsequent circuits.

Specifically, if it is notified that the PID inputted into the PID filter unit 10B is the same as a reference PID set for detecting a packet including video data as a result of the determination by the PID filter unit 10B, then the local processor 70 extracts video data from the packet PT. Similarly, if it is notified that the PID is the same as a reference PID set for detecting a packet including audio data, then the local processor 70 extracts audio data from the packet PT, and if it is notified that the PID is the same as a reference PID set for detecting a packet including private data, then the local processor 70 extracts private data from the packet PT. That is, the local processor 70 executes PID filtering with the use of the PID filter unit 10B.

The extracted various data is stored in a video data storage area, an audio data storage area or a private data storage area set in a memory 5 via the data bus 60. Thus, the stored various data is passed to each of the subsequent circuits, a video decoder 40, an audio decoder 50 and the host processor 30 according to the types, via the memory 5.

It is also possible to pass the extracted various data to the subsequent circuits not via the memory 5, similarly to the first embodiment. For example, it is possible to separately provide path to directly pass the various data to the respective subsequent circuits requiring the various data, though it is not shown in the figure. Thus, the present invention does not limit the method of passing the various data extracted by the respective filter units only to the path via the memory 5 described above, and various methods can be applied.

Furthermore, if it is notified to the local processor 70 that a PID to be inputted into the PID filter unit 10B is the same as a reference PID set for detecting a packet including section data, as a result of the determination by the PID filter unit 10B, then the local processor 70 extracts data required for section filtering as an object pattern OP.

The extracted object pattern OP is outputted to a determination circuit 23 provided for the section filter unit 20B. In an extraction condition storage circuit 21 provided for the section filter unit 20B, extraction conditions are set in advance by the host processor 30 via the local processor 70 or a path not shown in the figure (for example, the data bus 60 as in FIG. 1). Then, at a grouping circuit 22 and the determination circuit 23 provided for the section filter unit 20B, it is determined whether or not the object pattern OP satisfies the extraction conditions (an AND condition, a MASK condition, a NOT condition and an NGRP condition), similarly to the case of the receiving apparatus shown in FIG. 1.

The determination circuit 23 provided for the section filter unit 20B notifies a result of the determination to the local processor 70. Based on the determination result, the local processor 70 extracts a part or all of the packet PT stored in the local memory 80, as section data. That is, the local processor 70 executes section filtering with the use of the section filter unit 20B.

The extracted section data is stored in a section data storage area set in the memory 5, via the data bus 60. Therefore, the stored section data is passed to the host processor 30 via the memory 5.

Similarly to the first embodiment, it is also possible to pass the section data not via the memory 5. For example, it is possible to separately provide paths to directly hand the various data to the respective subsequent circuits requiring the various data, though it is not shown in the figure. Thus, the present invention does not limit the method of passing the various data extracted by the respective filter units only to the path via the memory 5 described above, and various methods can be applied.

Though the local memory 80 and the memory 5 are shown as separate storage devices in the receiving apparatus shown in FIG. 15, storage areas of the same storage device may be used as the local memory 80 and the memory 5.

In the local processor 70, it is also possible to temporarily store an operational result and the like during filtering processing in a work area of the local memory 80, which is not shown in the figure. The present invention does not limit the purpose of the memory 80 only to storage of a packet, and the memory 80 can be used for various purposes.

Alternatively, it is also possible to temporarily store an operational result and the like during filtering processing in a work area of the memory 5, which is not shown in the figure, via the data bus 60. The present invention does not limit the memory 5 only to the purpose of passing extracted data, and the memory 5 can be used for various purposes by each circuit connected to the data bus 60.

As described above, according to the receiving apparatus according to the third embodiment of the present invention, the local processor 70 can realize PID filtering and section filtering from a software aspect with the use of a circuit dedicated for certain processing (referred to as a hardware engine, an accelerator and the like) like a filter circuit represented by the PID filter unit 10B and the section filter unit 20B. Only by making change in software, such as programs and firmware, operating on the local processor 70, it is possible to perform filtering not only for section data but also for various data. Other points are substantially similar to the first embodiment, and redundant description thereof will be omitted.

As described above, though the present invention has been described with the use of the first to third embodiments, the statement and the drawings forming a part of this disclosure should not be interpreted to limit the present invention. From this disclosure, various alternative embodiments, examples and operation techniques will be apparent to those skilled in the art. The technical scope of the present invention is specified only by particular invention items according to the claims considered appropriate from the above description.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A receiving apparatus configured to extract particular section data from packets included in a received signal by using section filtering, the receiving apparatus comprising:
    an extraction condition storage circuit configured to store a first extraction condition for detecting a particular data pattern which identifies the particular section data and a second extraction condition for supplementing the first extraction condition;
    a grouping circuit configured to divide and collect the first extraction condition based on the second extraction condition to output multiple group extraction conditions; and
    a determination circuit configured to determine whether or not the data patterns of the packets satisfy the multiple group extraction conditions.

2. The receiving apparatus according to claim 1, further comprising:
    an object pattern extraction circuit configured to extract the data pattern from data targeted by filtering.

3. The receiving apparatus according to claim 2, wherein the determination circuit comprises:
    determination units for respective group numbers, into which each of the first and second extraction conditions is inputted according to the at least one or more group numbers set for the particular data pattern; and a comprehensive determination unit configured to make a comprehensive determination on results of the determination by the determination units for respective group numbers.

4. The receiving apparatus according to claim 3, wherein when dividing and collecting the first extraction condition outputted from the extraction condition storage circuit, based on group numbers indicated by the second extraction condition, the grouping circuit interpolates such values that the determination results by the determination units are to be TRUE as extraction conditions for blocks with group numbers other than a relevant group number.

5. The receiving apparatus according to claim 3, further comprising a group pattern extraction circuit configured to divide and collect the data patterns of the packets based on the group numbers to output multiple group patterns, wherein the multiple group extraction conditions and the multiple group patterns are outputted from the grouping circuit and the group pattern extraction circuit in a manner that the blocks in a group of blocks with the same group number are continuously arranged from a certain reference block position.

6. The receiving apparatus according to claim 1, further comprising an extracted data output circuit configured to extract and output the particular section data based on a result of the determination by the determination circuit.

7. The receiving apparatus according to claim 2, further comprising an extracted data output circuit configured to extract and output the particular section data based on a result of the determination by the determination circuit.

8. The receiving apparatus according to claim 3, further comprising an extracted data output circuit configured to extract and output the particular section data based on a result of the determination by the determination circuit.

9. The receiving apparatus according to claim 4, further comprising an extracted data output circuit configured to extract and output the particular section data based on a result of the determination by the determination circuit.

10. The receiving apparatus according to claim 5, further comprising an extracted data output circuit configured to extract and output the particular section data based on a result of the determination by the determination circuit.

11. A receiving method for extracting particular section data from packets included in a received signal by using section filtering, the receiving method comprising:

storing a first extraction condition for detecting a particular data pattern which identifies the particular section data and a second extraction condition for supplementing the first extraction condition;

dividing and collecting, by a grouping circuit, the first extraction condition based on the second extraction condition to output multiple group extraction conditions; and determining whether or not the data patterns of the packets satisfy the multiple group extraction conditions.

12. The receiving method according to claim 11, further comprising:

dividing and collecting the data patterns of the packets based on at least one or more group numbers set for each of the data patterns.

* * * * *